United States Patent
Areh et al.

(10) Patent No.: US 6,945,162 B2
(45) Date of Patent: Sep. 20, 2005

(54) FRUIT JUICER WITH INCREASED JUICE YIELD

(75) Inventors: Marko Areh, Radlje Ob Dravi (SI); Stanislav Mazej, Gomilsko (SI); Michael Steffl, Marquartstein (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/791,548

(22) Filed: Mar. 1, 2004

(65) Prior Publication Data

US 2005/0028683 A1 Feb. 10, 2005

Related U.S. Application Data

(63) Continuation of application No. PCT/EP02/09401, filed on Aug. 22, 2002.

(30) Foreign Application Priority Data

Aug. 29, 2001 (DE) .......................................... 101 42 246

(51) Int. Cl.[7] .............................................. A47J 19/02
(52) U.S. Cl. ........................................ 99/506; 099/508
(58) Field of Search ........................ 099/495, 501–508, 099/511–513; 100/112, 213; 210/413–415

(56) References Cited

U.S. PATENT DOCUMENTS

| | | | | |
|---|---|---|---|---|
| 1,861,426 A | * | 5/1932 | Davis et al. | 99/503 |
| 1,957,346 A | * | 5/1934 | Larson | 99/505 |
| 2,057,227 A | * | 10/1936 | Blum | 99/505 |
| 2,087,979 A | * | 7/1937 | Kennedy | 99/505 |
| 2,291,028 A | * | 7/1942 | Cummins | 99/505 |
| 3,575,223 A | * | 4/1971 | Hickel et al. | 99/501 |
| 4,125,064 A | | 11/1978 | Ackeret | |

FOREIGN PATENT DOCUMENTS

| | | |
|---|---|---|
| DE | 1 982 544 U | 4/1968 |
| DE | 28 06 096 A1 | 8/1979 |
| DE | 89 08 774.7 U | 10/1989 |
| EP | 0 362 058 B1 | 4/1990 |

* cited by examiner

Primary Examiner—Timothy F. Simone
(74) Attorney, Agent, or Firm—John T. Winburn; Russell W. Warnock; Craig J. Loest

(57) ABSTRACT

A fruit juicer has a rotating, upwardly-tapering, centrally-disposed, projecting element, for the pressing of a fruit. The element is surrounded by a collector dish, into which a stationary wall of a fixed annular body extends downwards. A device for compressing the fruit pulp, and thus squeezing additional juice out of the pulp, is formed on the wall. On rotating the collector dish with a motor drive the compression device forces the pulp of the fruit downwards in a generally wedge direction. The additional compression device is one or more blades that are fixed to or formed on the inner side of the projecting wall.

17 Claims, 1 Drawing Sheet

FRUIT JUICER WITH INCREASED JUICE YIELD

CROSS-REFERENCE TO RELATED APPLICATION

This application is a continuation, under 35 U.S.C. § 120, of copending international application No. PCT/EP02/09401, filed Aug. 22, 2002, which designated the United States; this application also claims the priority, under 35 U.S.C. § 119, of German patent application No. 101 42 246, filed Aug. 29, 2001; the prior applications are herewith incorporated by reference in their entirety.

BACKGROUND OF THE INVENTION

Field of the Invention

The present invention relates to a juicer or fruit press that comprises a rotating, upwardly tapering, centrally disposed, projecting element for the pressing of a fruit, and with a collection bin annularly surrounding the element and connected solidly to the latter, with openings for the fruit juice to pass through.

German Gebrauchsmuster DE 1 982 544 U1 describes a citrus press, which has a mechanical pressing device arranged downstream of a pressing cone for the fruit pulp loosened from the fruit peel by the pressing cone. The pressing device has a feed screw, disposed underneath the pressing cone on its drive shaft and surrounded by the sieve sleeve of a sieve enclosing the pressing cone.

European patent EP 0 362 058 B1 also discloses a fruit press, or fruit juicer. That juicer has an electric drive motor. The motor is mounted inside the housing. It drives a drive-side shaft, on which the fruit press is mounted, via a drive belt and belt pulley.

It is a common problem associated with the prior art that a certain amount of usable juice is not pressed from the fruit and that the juice yield is not maximized.

SUMMARY OF THE INVENTION

It is accordingly an object of the invention to provide a fruit juicer, which overcomes the above-mentioned disadvantages of the heretofore-known devices and methods of this general type and which is further improved such that the juice yield is increased.

With the foregoing and other objects in view there is provided, in accordance with the invention, a fruit juicer, comprising:

a centrally and rotatably disposed, upwardly tapering, projecting element for pressing fruit;

a collection bin annularly surrounding said element and rigidly connected to said element for rotating with said element in a direction of rotation, said collection bin having an annular surface and openings formed therein for fruit juice to pass through; and at least one blade disposed to squeeze fruit juice out of fruit pulp in said collection bin, said at least one blade being inclined downwardly in the direction of rotation, for compressing the fruit pulp between said blade and said annular surface.

In other words, the objects of the invention are achieved with a juicer of the type initially mentioned by providing a fixed device for pressing out the fruit juice projecting down into the collection bin.

The fruit juice yield is increased by the added squeezing device that presses out the fruit juice. The device remains fixed in place, while the collection bin rotates. By compressing the fruit pulp squeezed by the pressing cone out of the fruit it is possible to prolong the use time of the fruit press, for example to double it, without having to clean it.

In a preferred embodiment the fruit press is wherein the means has at least one downwards inclined blade, by means of which the fruit juice can be squeezed out of the fruit flesh present in the collection bin by rotating it.

In a preferred variant the means comprises an annular body surrounding the collection bin.

The annular body is preferably constructed such that it has a first wall, overlapping an outer wall of the collection bin inwards and projecting down into the collection bin, on which at least one blade is attached. In this way, a simply constructed vessel is created, which surrounds the fruit press. The wall likewise contributes to the fact that no fruit flesh accumulates and sets in the slot projecting into a mantle wall of the collection bin at the outlet for the fruit juice.

In a further development of the invention the annular body has an outwards directed collar, with which it bears on a collector dish. An easy-to-handle assembly for a fruit press and a dish arranged under it are created by this particular construction.

In another preferred embodiment of the invention the annular body has a second wall, projecting down between the outer wall of the collection bin and a mantle wall of the collector dish.

Other features which are considered as characteristic for the invention are set forth in the appended claims.

Although the invention is illustrated and described herein as embodied in a fruit juicer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
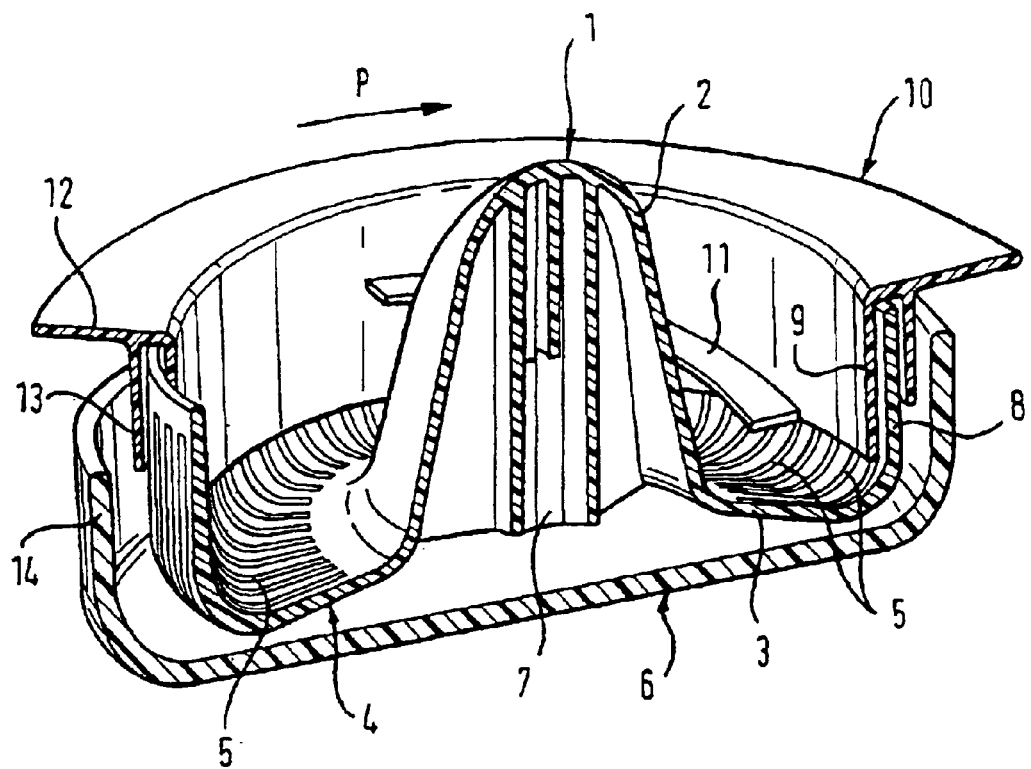
FIG. 1 is a perspective sectional view of a fruit juicer.

Referring now to the figures of the drawing in detail and first, particularly, to FIG. 1 thereof, there is shown a fruit juicer or fruit press 1 with a central pressing element 2. The element 2, substantially has an enveloping shape of a rotation parabola, a hemisphere, a semi-ellipsoid or a cone, and it is enclosed at its base by an annular surface 3. Fruit juice collects in the annular surface 3. Fruit juice is produced by pressing fruit over the element 2. The ring surface 3 is part of a collection bin 4. The fruit juice drips out of this through rib-like slots 5 into a collector dish 6, in which the fruit juice is trapped.

The element 2 is designed substantially as a hollow body, in which a hollow shaft 7 to receive a non-illustrated trunnion is arranged centrally for rotatingly driving the fruit press 1, that is, the element 2 and the collection bin 4 surrounding it, which is connected to a drive shaft of a drive motor.

The collection bin 4 has a circular outer wall 8, over which a wall 9 of a fixed annular body 10 projects down. Two blades or wings 11 are disposed on the inside of the wall 9. The two blades 11, which are disposed diagonally across one another on the wall 9, are inclined downwards in the direction of rotation of the collection bin, such that fruit pulp, which has been loosened from the fruit to be pressed during the pressing procedure, is compressed more and more in the region between the blades 11 and the annular surface 3. The result is that even more fruit juice is pressed or squeezed out of the fruit pulp or fruit flesh. An added effect of the blades 11 is that the fruit pulp is compressed, such that it does not suck up the fruit juice flowing past in the pressing procedure, and that the fruit press 1 does not have to be removed from the collector dish 6 so often for cleaning.

Figure 2:
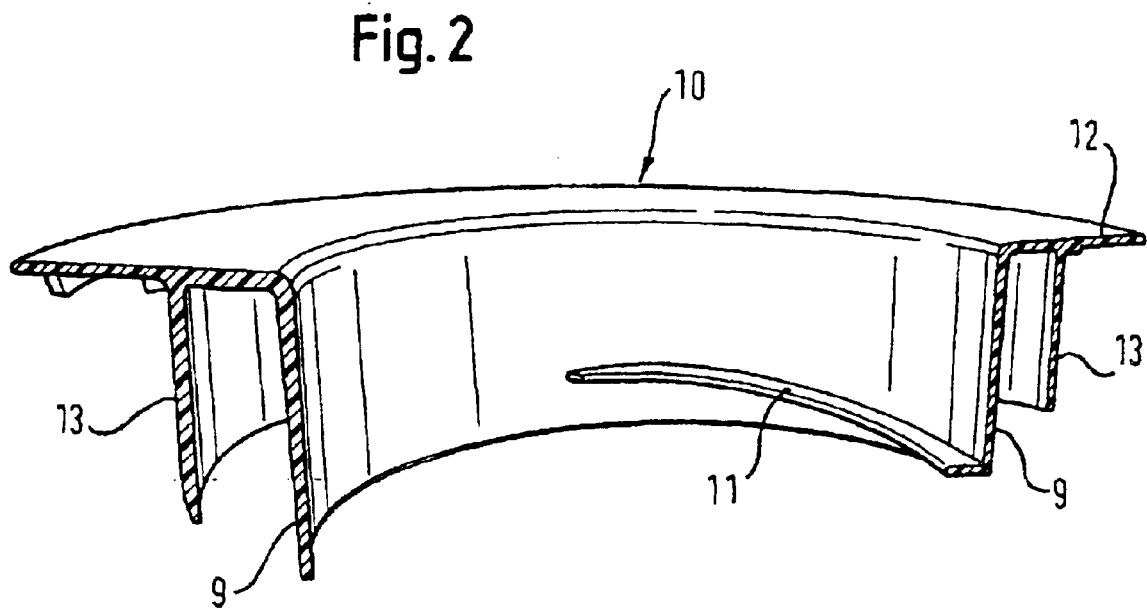
FIG. 2 is a perspective sectional view of an annular body surrounding the fruit press.

Referring now to FIG. 2, the annular body 10 also has an outwardly projecting collar 12, with which it bears on the collector dish 6, and a ridge wall 13, which projects down between the outer wall 8 of the collection bin 4 and a outer wall 14 of the collector dish 6.

The invention thus provides for a fruit press 1 with a rotating, upwardly tapering, centrally disposed, projecting element 2 for pressing a fruit. The element 2 is enclosed by a collector dish 6, into which a wall 9 of a fixed annular body 10 protrudes. On the wall 9 is a means for squeezing the fruit pulp, which presses the fruit pulp downwards by rotating the fruit press 1 by a motor drive in the direction of an arrow P. The means according to the above-described preferred embodiment, is in the form of a blade 11 or a multiplicity of blades 11, attached to the inner side of the wall 9.

We claim:

1. A fruit juicer, comprising:
   a rotatably disposed, upwardly tapering, projecting element for pressing fruit:
   a collection bin annularly surrounding said element and rigidly connected to said element for rotating with said element in a direction of rotation, said collection bin having an annular surface and openings formed therein for fruit juice to pass through; and
   at least one stationary blade disposed to squeeze fruit juice out of fruit pulp in said collection bin, said at least one blade being inclined downwardly in the direction of rotation, for compressing the fruit pulp between said blade and said annular surface.

2. The fruit juicer according to claim 1, wherein said element is centrally disposed in said collection bin and said blade is one of at least two blades symmetrically mounted relative to said element.

3. The fruit juicer according to claim 1, wherein the downwards inclined blade extends helically along a part of the periphery of the collection bin.

4. The fruit juicer according to claim 1, which further comprises an annular body surrounding said collection bin, and wherein said blade is disposed on said annular body.

5. The fruit juicer according to claim 4, wherein said collection bin has an outer wall, and said annular body is formed with a wall projecting downwardly into said collection bin and inwardly overlapping said outer wall of said collection bin.

6. The fruit juicer according to claim 5, wherein said at least one blade is attached to said downwardly projecting wall.

7. The fruit juicer according to claim 4, wherein said annular body has an outwardly projecting collar configured to support said annular body on a collector dish.

8. The fruit juicer according to claim 4, wherein said wall of said annular body is a first wall, and said annular body has a second wall projecting downwardly between said outer wall of said collection bin and an outer wall of a collector dish.

9. A juicer, comprising:
   a rotatably mounted collection bin having a generally cylindrical shape with an outer wall and a bottom, and having a pressing element centrally disposed therein, said pressing element projecting upwardly from said bottom and said bottom having openings formed therein for fruit juice to pass through in a trough formed between said pressing element and said outer wall;
   at least one stationary blade disposed in said trough between said pressing element and said outer wall and inclined downwardly in a direction of rotation of said collection bin, for squeezing fruit juice out of fruit pulp by compressing the fruit pulp between said blade and said annular surface as said collection bin rotates; and
   a collection container disposed below said collection bin for collecting the fruit juice emanating from said openings in said bottom.

10. A fruit juicer, comprising:
    an annular body;
    a collection bin mounted for rotation with respect to the annular body, the collection bin having a bottom surface defining multiple openings permitting fruit juice to pass through the bottom surface;
    a pressing element projecting from the collection bin in an axial direction and being fixed to the collection bin for rotational movement with respect to the annular body; and
    an elongated member projecting radially inwardly from the annular body and extending in a circumferential direction along the annular body, the elongated member being inclined downwardly toward the bottom surface and compressing fruit pulp between the elongated member and the bottom surface when the collection bin and pressing element rotate in relation to the annular body and elongated member.

11. The fruit juicer according to claim 10, further comprising a second elongated member projecting radially inwardly from the annular body and extending in a circumferential direction along the annular body, the second elongated member inclining downwardly toward the bottom surface and disposed opposite the first elongated member.

12. The fruit juicer according to claim 10, wherein the downwardly inclined elongated member extends helically along the annular body.

13. The fruit juicer according to claim 10, wherein the annular body comprises a cylindrical wall extending downwardly toward the bottom surface, the collection bin having a cylindrical outer wall disposed adjacent the wall of the annular body.

14. The fruit juicer according to claim 13, wherein the annular body comprises a cylindrical ridge wall extending downwardly toward the bottom surface, the ridge wall being disposed radially outwardly from the wall and the outer wall being at least partially disposed between the wall and the ridge wall.

15. The fruit juicer according to claim 13, wherein the elongated member is attached to the downwardly extending wall of the annular body.

16. The fruit juicer according to claim 10, a collection container disposed below the collection bin, the collection container receiving and retaining fruit juice passing through the openings in the bottom surface.

17. The fruit juicer according to claim 16, wherein the annular body has a radially outwardly projecting collar engaging the collection container and supporting the annular body on the collection container.

* * * * *